(No Model.) 3 Sheets—Sheet 1.

A. SWINDLER.
TYPE WRITING MACHINE FOR THE BLIND.

No. 578,785. Patented Mar. 16, 1897.

Witnesses.
H. C. Perrin
J. M. Willis.

Inventor.
Albert Swindler,
By Oliver U. Perrin,
His Attorney.

(No Model.) 3 Sheets—Sheet 2.

A. SWINDLER.
TYPE WRITING MACHINE FOR THE BLIND.

No. 578,785. Patented Mar. 16, 1897.

Witnesses.
H. E. Perrin
J. M. Willis.

Inventor.
Albert Swindler,
By Oliver U. Perrin,
His Attorney.

(No Model.) 3 Sheets—Sheet 3.
A. SWINDLER.
TYPE WRITING MACHINE FOR THE BLIND.
No. 578,785. Patented Mar. 16, 1897.
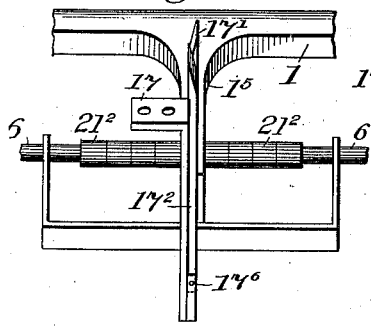
Fig. 12.
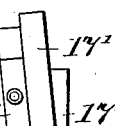
Fig. 13.
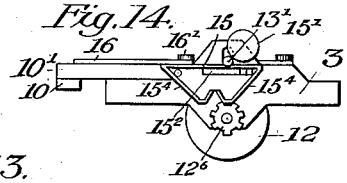
Fig. 14.
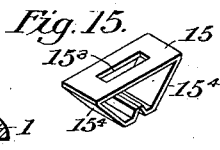
Fig. 15.
Fig. 16.
Fig. 17.
Fig. 18.
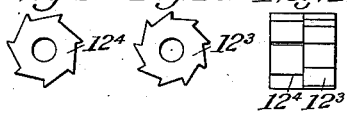
Fig. 19. Fig. 20. Fig. 21.
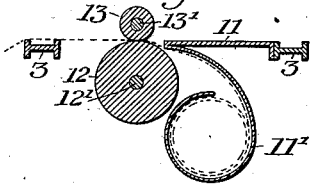
Fig. 22.
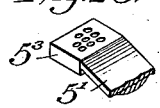
Fig. 23.
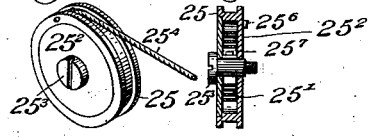
Fig. 24. Fig. 25.
Fig. 26.
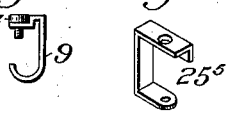
Fig. 27. Fig. 28.
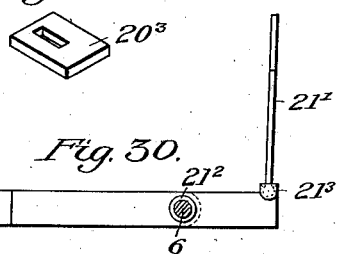
Fig. 29.
Fig. 30.
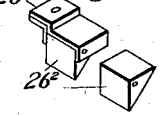
Fig. 31.
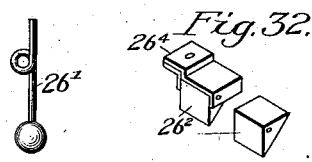
Fig. 32.
Fig. 33.
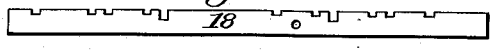
Fig. 34.
Witnesses.
H. E. Perrin
J. M. Willis.
Inventor.
Albert Swindler,
By Oliver U. Perrin,
His Attorney

UNITED STATES PATENT OFFICE.

ALBERT SWINDLER, OF BROWN'S VALLEY, INDIANA.

TYPE-WRITING MACHINE FOR THE BLIND.

SPECIFICATION forming part of Letters Patent No. 578,785, dated March 16, 1897.

Application filed October 16, 1895. Serial No. 565,916. (No model.)

*To all whom it may concern:*

Be it known that I, ALBERT SWINDLER, a citizen of the United States, residing at Brown's Valley, in the county of Montgomery and State of Indiana, have invented a new and useful Punctograph or Point-Writer for the Blind, of which the following is a specification.

My invention relates particularly to a point-writing or puncturing machine for the blind, and has for its object in general the production of a puncturing-machine whereby either of two systems of point-writing, commonly known as the "New York" and "Braille" systems, may be successfully accomplished by the writer with rapidity and ease. I have fully attained this object by the construction and trial of the mechanism illustrated in the accompanying drawings, forming a part of this specification, in which—

Figure 1:
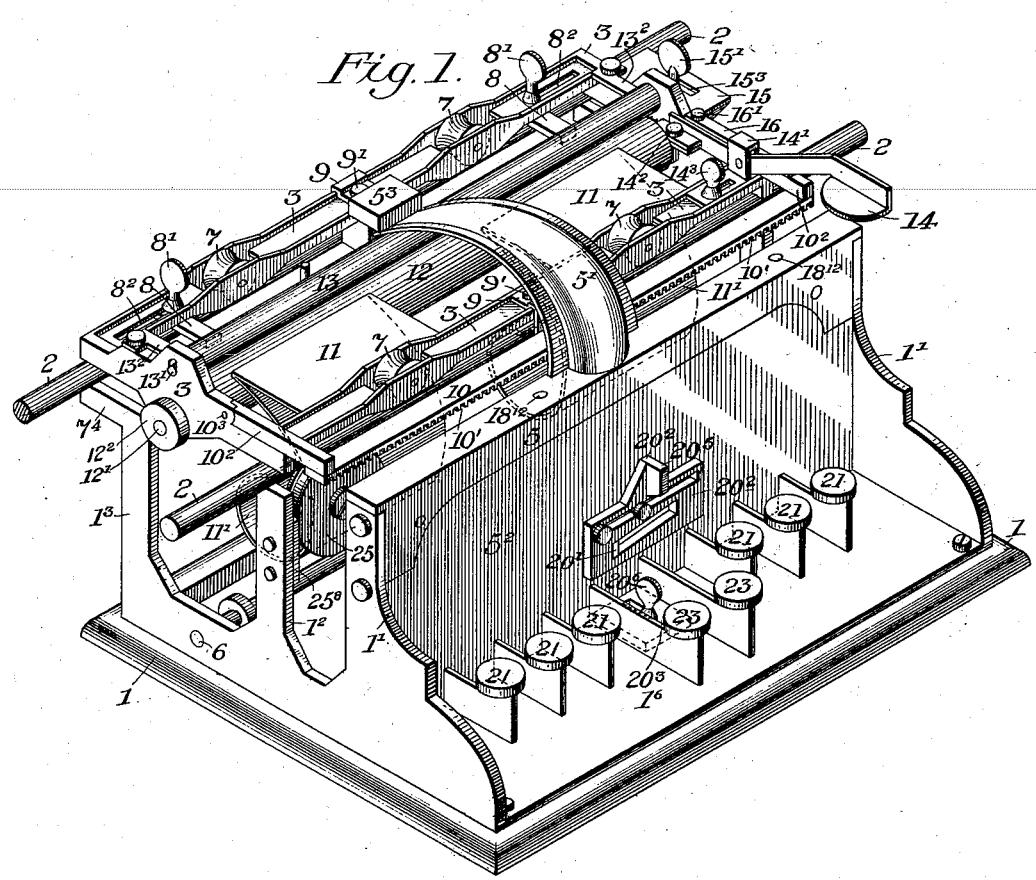
Figure 4:
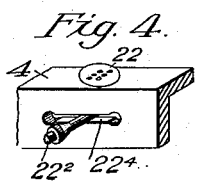
Figure 5:
Figure 6:
Figure 7:
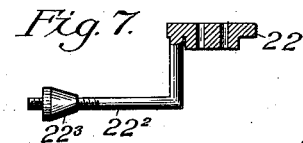
Figure 2:
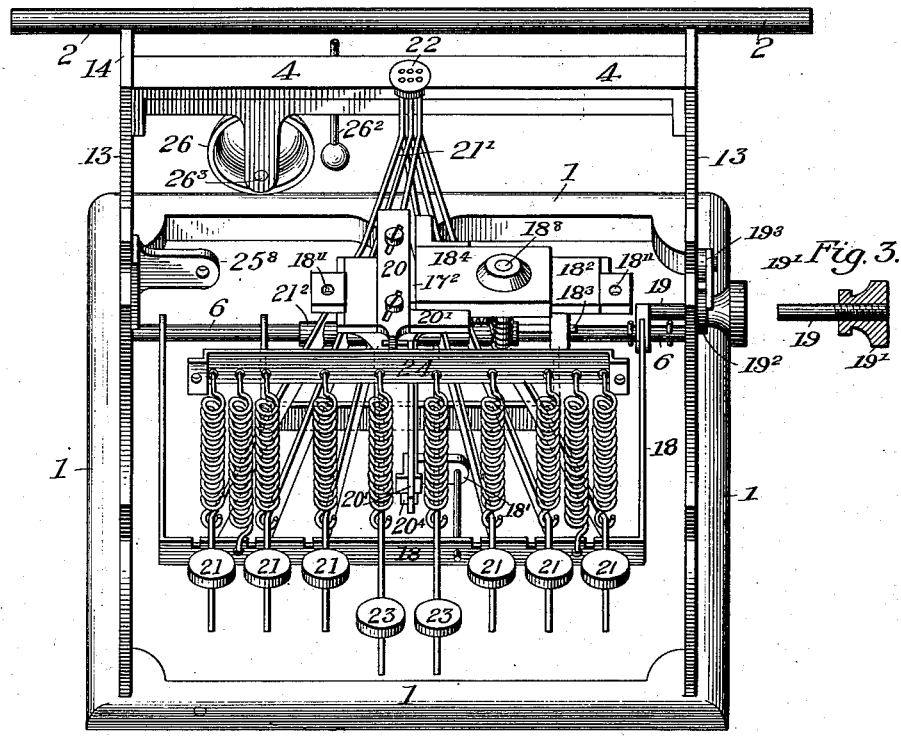
Figure 3:
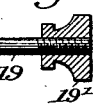
Figure 8:
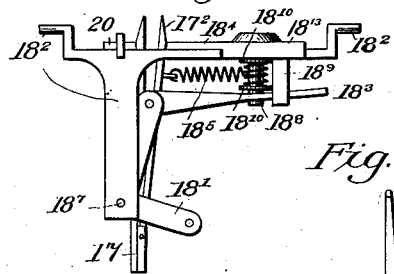
Figure 9:
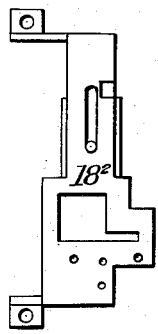
Figure 10:
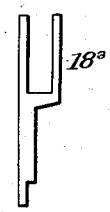
Figure 11:
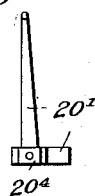

Figure 1 is a perspective view of the machine entire. Fig. 2 is a front view showing the hidden parts in Fig. 1 by the removal of the carriage with its operating parts, the front frame-piece having the gooseneck projection, and the front plate secured to the front frame-piece and the base-plate fixed to the supporting-frame of the machine. Fig. 3 is a longitudinal section of the circular screw-nut $19'$. Fig. 4 is a rear view of the system point-changer 22 seated in the rear frame-piece 4. Fig. 5 is a view showing the suitably-formed reciprocal aperture in the rear frame-piece 4 for the reception of the point-changer 22. Figs. 6 and 7 are respectively a detail view and cross-section of the system point-changer 22. Figs. 8 and 9 are respectively a front plan view of the carriage-feed and point-spacing mechanism and a bottom plan of its irregular supporting-frame. Fig. 10 is a detail view of the forked traveler-rod $18^3$. Fig. 11 is a side plan of the oscillatory lever $20'$. Figs. 12 and 13 are respectively a front plan and side plan of the carriage-feed mechanism mainly hidden in Fig. 2. Fig. 14 is an end plan of the carriage unshown in Fig. 1. Fig. 15 is a detail view of the bent steel spring 15. Figs. 16, 17, and 18 are respectively side views and end plans of the retaining stop-gears $12^5$ and $12^6$. Figs. 19, 20, and 21 are respectively side plans and end views of the impelling-gears $12^3$ and $12^4$. Fig. 22 is a cross-section of the carriage on the line M N, Fig. 1. Fig. 23 is a detail view showing the little sockets on the under side of the gooseneck projection $5'$ at the outer end for the reception of the ends of the puncturing-rods $21'$. Figs. 24 and 25 are respectively a perspective view and a cross-section of the drawing or impelling spring mechanism for the carriage. Fig. 26 is a view showing one of the line-gaging devices 8. Fig. 27 is a side plan of one of the carriage-frame holders 9 secured centrally on the carriage-frame. Fig. 28 is a detail view of the cord-holding device 25 at the right end of the carriage-frame, Fig. 1. Fig. 29 is a detail view of the movable finger-block $20^3$. Fig. 30 is a side plan of one of the key-levers 21 and puncturing-rods $21'$, a side plan of one of the blank key-levers 23 being indicated and shown by the dotted lines of this figure. Fig. 31 is a view of the pivoted striker $26'$. Fig. 32 is a detail view of the pivoted triangular tripper $26^2$. Fig. 33 is a detail view of a portion of the feed-rack 10. Fig. 34 is a front plan view of the fulcrumed space-bar 18.

Like numbers of reference indicate corresponding parts throughout the several views.

The framework of my machine comprises a main rectangular supporting-frame 1, a pair of carriage-track rods 2, secured upon the upper ends of the standards of the supporting-frame, a rectangular carriage-frame 3, provided with two pairs of rollers reciprocally adapted to and to travel longitudinally on the carriage-track rods, a rear frame-piece 4, provided with the system point-changer and a bell signal mechanism, rigidly fixed to and between the rear standards of the supporting-frame, a front frame-piece 5, having a gooseneck projection secured to and between the front elevations of the supporting-frame, and a screw-rod 6, rigidly fastened in the supporting-frame for the purpose of forming an oscillation shaft or axis for the feed, space, and key levers.

1 is the rectangular supporting-frame of my machine, formed with the front elevations $1'$ $1'$, the front standards $1^2$ $1^2$, having a carriage-track rod 2 securely fixed to the upper ends, and the rear standards $1^3$ $1^3$, having the projections $1^4$ $1^4$ running rearwardly and provided with a carriage-track rod 2, rigidly fixed to the upper side at the outer end of said projections. A projection $1^5$ is also suitably formed on the inside of the rectangular supporting-frame from the rear side (see Figs. 2, 12, and 13) for the purpose of forming a seat or support for the screw-rod 6 and the supporting-frame of the carriage-feed mechanism.

3 is a suitably-formed rectangular carriage-frame pierced with all the necessary slits and openings essential to the full and complete operation and adjustment of its several working parts and provided with two pairs of rollers 7 7', mounted in the frame at about equal distances from its ends, reciprocally adapted to and to travel longitudinally upon the carriage-track rods 2 for the purpose of permitting the carriage to travel lengthwise upon said rods in manipulating the machine. At the rear side of the carriage-frame is a pair of adjustable line-gages 8, consisting of a thumb-screw 8' and a body portion 8, (see Fig. 26,) adapted to be adjusted longitudinally in their slots $8^2$ for the purpose of varying the length of the puncture-line on the paper when desired. These line-gages 8 on meeting the end of the gooseneck projection 5' stop the carriage when drawn in either direction.

Centrally secured on the carriage-frame is a pair of holders 9, composed of a set-screw 9' and a bent body portion 9, (see Fig. 27,) semicircular at the bottom and formed suitably to the upper side of the frame at the top, for the purpose of holding the carriage on the track-rods 2 by means of the semicircular portion of the holders hooking under said rods, as shown in Fig. 27.

10 is the carriage-feed rack, having the under side formed with suitable transverse grooves 10', adapted to reciprocally receive the upper ends of the oscillating T and feed and check levers 17' and $17^2$ of the carriage-feed mechanism (see Figs. 33, 8, 12, and 13) successively and consecutively as they are caused to complete an oscillation about their pivotal pins in manipulating the machine, for the purpose of feeding the carriage regularly and uniformly in point-writing. The arms $10^2$ of the carriage-feed rack run backward over the carriage-frame and are hinged thereto at $10^3$ for the purpose of allowing the rack to be raised above the oscillating feed-levers in returning it to begin a new line or when manually running it in either direction without manipulating the machine.

The bent paper-holding device comprises two sections 11, having a cylindrical or roll lower portion 11', curving uniformly toward its integral rectangular upper portion 11. (See Figs. 1, 14, and 22.) The paper to be punctured in writing with this machine is rolled and inserted endwise into the roll portion of the holder, and its outer edge is trailed by the uniform curve to the actuating feed-roller 12 and its reciprocating auxiliary roller 13, which feed the paper automatically and uniformly for line-spacing by the manipulation of the line-spacing rack-raising lever 14 and pass it out between the outer end of the gooseneck projection 5' (see Figs. 1 and 23) and the system point-changer 22 and the puncturing-rods 21' directly underneath it (see Figs. 2 and 4) for the purpose of puncturing the paper in manipulating the key-levers of the machine. The course of the paper is shown by the dotted line in Fig. 22.

The paper-feed and line-spacing mechanism comprises an actuating feed-roller 12, an auxiliary reciprocating roller 13, and a line-spacing rack-raising lever 14. A thumb-wheel $12^2$ is rigidly fixed upon one end of the actuating-roller axle 12' and impelling-gears $12^3$ and $12^4$ and retaining stop-gears $12^5$ and $12^6$ at the opposite end of said axle, the impelling-gears $12^3$ and $12^4$ being rigidly fixed upon the axle inside of the carriage-frame 3 and the retaining stop-gears $12^5$ and $12^6$ outside of said frame. (See Figs. 1, 14, 16, 17, 18, 19, 20, and 21.) It will be noticed that the impelling-gears $12^3$ and $12^4$, respectively, have seven and nine triangular serratures in their periphery (see Figs. 19 and 20) for the purpose of properly spacing the lines in writing, respectively, with the Braille and New York systems, the Braille being three points high and the New York two.

It will further be seen that the retaining stop-gears $12^5$ and $12^6$ have, respectively, seven and nine U-shaped serratures in their periphery (see Figs. 14, 16, and 17) for the purpose of stopping and retaining the actuating feed-roller 12 in its line-space while writing with the Braille and New York respectively. The impelling-gears $12^3$ and $12^4$ and retaining stop-gears $12^5$ and $12^6$ may be formed with a greater or a less number of serratures, proportional, or about so, to seven and nine, and accomplish the desired result, the gears having the less number of serratures being used in line-spacing and retaining the actuating feed-roller 12 for the Braille and the gears having the greater number of serratures is used in the New York system.

The mechanical device for stopping and retaining the actuating feed-roller 12 consists of an adjustable bent steel spring 15, a thumb-screw 15', and a projecting lug $15^2$ on the carriage-frame 3, forming a table-like support for the bent steel spring 15, and is provided with reciprocal openings for the reception of the thumb-screw 15'. The bent steel spring 15 is provided with an elongated slot $15^3$ for the reception of the retaining thumb-screw 15' and a pair of arms $15^4$, projecting downwardly and inwardly from its opposite ends and sides, that the reciprocal ends of said arms may operate against the serrated periphery of the retaining stop-gears $12^5$ and $12^6$. It will be seen in Fig. 14 that the bent steel spring 15 is adjusted and set with its rear arm $15^4$ operating against the outer retaining stop-gear $12^6$ (see Figs. 16 and 18) for stopping and retaining the actuating feed-roller 12 in its proper line-space when writing in the Braille system. Said spring is adjusted and set rearwardly with its front arm $15^4$ operating against the inner retaining stop-gear $12^5$ for maintaining the proper line-space when writing in the New York system.

The auxiliary reciprocating roller 13 comprises the roller portion 13 and its axle 13', having its ends working in reciprocal slot-openings in the carriage-frame 3 for the purpose of permitting said roller to adjust itself automatically to the thickness of the paper in revolving with its actuating-roller 12. The roller 13 is held normally against its impelling-roller 12 by the inner ends of the springs $13^2$ pressing down upon its axle between the roller portion and the carriage-frame.

The line-spacing rack-raising lever 14 is fulcrumed in its adjustable supporting-frame 14' and provided at the inner end with a bent spring-hook $14^2$, adapted to catch at its lower end in the serratures of the impelling-gears $12^3$ and $12^4$ and to revolve the actuating feed-roller 12 one space at a single stroke on the outer end of said lever. The adjustable supporting-frame 14' of the lever 14 is adapted to be moved longitudinally in the groove it occupies on the upper side of the supporting-frame and to be rigidly secured to said frame by the thumb-screw $14^3$. By adjusting this supporting-frame 14' the bent spring-hook $14^2$ at the inner end of the lever may be set so as to engage with either of the impelling-gears $12^3$ or $12^4$ to line-space properly for either the Braille or New York system. As shown in Fig. 1, the lever is set for the Braille system, its bent spring-hook being in engagement with the outer impelling-gear $12^4$, (see Fig. 19,) having the less number of serratures.

Another purpose served by the line-spacing lever 14 is the raising of the carriage-feed rack 10 off the ends of the oscillating T and feed and check levers of the carriage-feed mechanism for the purpose of moving the carriage freely in either direction when desired. I accomplish this purpose by providing the hinged arm $10^2$ of the feed-rack with a projecting pin or stud $10^4$, adapted to play in a reciprocal slot $14^5$ of the lever 14. A straight steel spring 16 is rigidly fixed to the carriage-frame at 16', back of the feed-rack arm $10^2$, which it presses down upon and holds in its normal position and returns thereto when the rack is raised by a stroke on the lever 14 and releasing it.

The carriage-feed mechanism consists of a supporting-frame 17, an oscillating retaining T-lever 17', an auxiliary feed and check lever $17^2$, a straight steel spring $17^3$, a small elbow-lever $17^4$, and a feed-bar $17^5$. (See Figs. 2, 8, 12, and 13.) The supporting-frame 17, being secured firmly at the upper end to the irregular frame $18^2$ of the point-spacing mechanism, is rigidly fixed at the lower inner end to the inside projection $1^5$ of the main supporting-frame of my machine. The retaining T-lever 17', having an auxiliary feed and check lever $17^2$, adapted to oscillate about its pivotal pin $17^6$, is pivoted at $17^7$ to its supporting-frame, that it may oscillate longitudinally with the grooves on the under side of the carriage-feed rack 10. It should be noted here that the auxiliary feed and check lever $17^2$ has two movements, one with that of the oscillating retaining T-lever 17' and another oscillatory movement in an opposite direction about its pivot-pin, the purpose of this double movement of the lever being apparent, the first to release and to reëngage the feed-rack 10, the second to effect the reëngagement at a different groove in said feed-rack, so as to allow the carriage to travel a uniform and fixed distance at each oscillation of the levers for the purpose of spacing. An inward-projecting arm of the oscillating T-lever 17' is pressed down upon by the steel spring $17^3$ and operated against underneath by the elbow-lever $17^4$, pivoted about its center to the supporting-frame 17 and suitably connected at the inner end with the feed-bar $17^5$, having rearwardly-projecting arms fulcrumed on the screw-rod 6.

The operation of the carriage-feed mechanism will be referred to again hereinafter in connection with the working of the point-spacing mechanism, comprising a fulcrumed space-bar 18, an angle-lever 18', suitably connected with the space-bar, an irregular frame $18^2$, to which the angle-lever is pivoted, a forked traveler-rod $18^3$, pivoted to the upper arm of the angle-lever, a rectangular traveler $18^4$, and a connecting-spring $18^5$ between said traveler and the auxiliary feed and check lever $17^2$ of the carriage-feed mechanism. The space-bar 18 is fulcrumed at the rear ends of its arms to the screw-rod 6 and its front portion provided with a series of slots, as shown in Fig. 34, for the purpose of securing the proper spacing when using either the Braille or New York system of point-writing. 19 is a space-bar shifter having a circular-shaped enlargement at its inner end, provided with a reciprocal opening for the screw-rod 6 and a reciprocal slot for the reception of the inner end of the space-bar arm, and at its outer end a circular screw-nut 19', having an annular rim $19^2$ adjacent to the supporting-frame 1 of the machine, and a holder $19^3$ reciprocally overlapping the annular rim and rigidly secured to the supporting-frame 1 by a set-screw. Said circular screw-nut may be turned in either direction to impel the shifter-rod 19 inwardly or outwardly and the space-bar 18 therewith for the purpose of setting the proper slots directly under the key-levers 21 and 23 in writing with either the Braille or New York system. The slots having regular depths are used in writing the Braille system and those being of irregular depths are used for writing the New York system.

As will be seen in Fig. 2, there is a suitable connecting-rod $18^6$ between the space-bar 18 and the oscillatory angle-lever 18', which is pivoted about the angle of its arms by a pivotal pin $18^7$ (see Fig. 8) to the downwardly-projecting arm of the irregular supporting-frame $18^2$, the same being pierced with all necessary reciprocal slits and openings essential to the full and complete working of its several parts. A forked traveler-rod $18^3$, pivoted at the end of the upper angle-lever arm 18', is forked at the outer end, (see Fig. 10,) its two members being adapted to pass through reciprocal openings or slots in the lower ends of the screw-shank $18^8$ of the traveler $18^4$ and of the projection $18^9$ of the irregular frame. (See Figs. 2, 8, and 9.) The rectangular traveler $18^4$ is formed with a conical elevation on its upper side, having a reciprocal screw-opening through said elevation for the reception of its screw-shank $18^8$, working through a suitable reciprocal slot in the irregular supporting-frame $18^2$, and provided with an expansion-spring $18^{13}$, encircling the screw-shank, and circular washers $18^{10}$, encircling said screw-shank at the ends of the spring for the purpose of holding the traveler $18^4$ to its reciprocal frame. A connecting-spring $18^5$ is hooked at one end to the expansion-spring $18^{13}$ encircling the screw-shank of the traveler and at the other to the feed and check lever $17^2$, as shown in Fig. 8, for the purpose of drawing said lever with the traveler when it is thrust backward on its reciprocal frame by a stroke on one of the key-levers and to return the traveler $18^4$ with the oscillating feed and check lever as it is impelled to its normal and vertical position by its reëngagement with the carriage-feed rack 10 as the retaining T-lever disengages with said rack on releasing the key-lever struck. $18^{11}$ are reciprocal screw-openings for the reception of set-screws $18^{12}$ to fasten the irregular frame $18^2$ to the under side of the front frame-piece 5. By a single downward stroke on any one of the key-levers 21 and 23 the operating parts of the carriage-feed mechanism and of the point-spacing mechanism, suitably connected and pivoted, as hereinbefore described, are respectively thrown forward, as shown in Figs. 13 and 8, and upon the stricken key-lever being released regain their normal position, as shown, respectively, in Figs. 12 and 2, thereby feeding the carriage uniformly and regularly and properly spacing the words and points.

In connection with the description of the point-spacing mechanism it will be well to note another feature of my invention, namely, the mechanism for cutting off one point to write a musical notation known as "waits," comprising an adjustable space-bar 20, an oscillatory lever 20', adapted to impel said space-bar, and a movable thumb-slide $20^2$, adapted to actuate said oscillatory lever, and a movable thumb-block $20^3$, adapted to cut off one point by being set out from under the ends of the blank-key levers 23 used for spacing only. (See Figs. 1, 2, and 8.) The movable space-bar 20 is set transversely on the upper side of the irregular frame $18^2$ alongside the oscillating T and feed and check levers 17' and $17^2$ by set-screws working in reciprocal slots running diagonally across the body of the bar for the purpose of sliding said bar sidewise, so as to infringe the distance of one point-space upon the oscillating T and feed and check levers on being impelled backward by the oscillatory lever 20', having a reciprocal hook-and-eye connection with the space-bar 20, and pivoted in a little supporting-frame $20^4$, secured to the front frame-plate $5^2$ of the machine, having its projecting end working in a suitably-formed reciprocal slot in the front frame-plate and a reciprocal slot running diagonally across the body of the movable thumb-slide $20^2$ for actuating the oscillatory lever to impel the adjustable space-bar 20 inwardly, so as to infringe the distance of one point-space upon the oscillating T and feed and check levers 17' and $17^2$ or to impel said space-bar outwardly for releasing it from its infringement on the oscillatory T and feed and check levers when the musical notation is not being used by the manipulator. The movable thumb-slide $20^2$ is provided at the upper side with a pair of elongated slots reciprocally receiving a pair of set-screws whereby said thumb-slide is securely fixed to the front frame-plate of the machine and adapted to be manipulated longitudinally by the thumb-lug $20^5$ on its face.

The movable thumb-block $20^3$, (see Fig. 29,) having an elongated slot reciprocally receiving the thumb-screw $20^6$ for rigidly securing it to the base frame-plate $1^6$ of the machine, is adapted to be set out from under the ends of the blank key-levers 23 for the purpose of adding to the blank space the distance that has been taken away from it by the infringement of the space-bar 20 upon the oscillating T and feed and check levers 17' and $17^2$ for reducing the point or punctured space in writing Wait's musical notation. As shown in Fig. 1, the movable thumb-block $20^3$ is set for writing Wait's musical notation. By the adjustment of this block the blank spacing of the machine may be kept uniform in writing the different systems.

The puncturing mechanism comprises the key-levers 21 and the puncturing-rods 21'. (See Figs. 1, 2, and 30.) The key-levers 21, being rigidly fixed upon the cylindrical hubs $21^2$, (see Fig. 12,) adapted to and to oscillate freely on the screw-rod 6, forming an axis or shaft for said cylindrical reciprocal hubs $21^2$, are the actuating devices of the carriage-feed and point-spacing mechanism and have a ball-and-socket connection $21^3$ with the steel puncturing-rods 21' at their inner ends, the steel puncturing-rods 21' having their upper ends working through reciprocal openings in the circular system point-changer 22 for the purpose of puncturing the paper as it passes between the circular changer 22 and the outer end of the gooseneck projection 5' above it. (See Figs. 2 and 1.) The blank key-levers 23, being of the form and general outline shown by the dotted lines in Fig. 30 and rigidly fixed at their inner ends upon cylindrical hubs $21^2$, adapted to and to oscillate freely upon the screw-rod 6, are simply used to actuate the carriage-feed and point-spacing mechanism for spacing only.

The system point-changer 22 being circular in plan fits snugly into a suitably-formed reciprocal aperture 22' in the rear frame-piece 4 of the machine. (See Figs. 2, 4, 5, 6, and 7.) The position of the point-changer 22 being directly underneath the outer end or platen 5³ of the gooseneck projection 5', as shown in Fig. 1, the under side of the outer end or platen 5³ being pierced suitably with a series of little sockets, as shown in Fig. 20, adapted to receive the ends of the puncturing-rods 21' for puncturing the paper, said point-changer 22 consists of a circular body portion 22, having a small annular groove around its periphery and under side, a series of reciprocal openings for the reception of the puncturing-rods, and a controlling arm or lever 22², projecting downwardly from the bottom of the small annular groove and then bent at right angles, having an outer screw end and a reciprocal cone-nut 22³ for the purpose of setting and rigidly fixing the circular changer in position to write in the Braille or New York system. The point-changer is adapted to be turned or oscillated in its reciprocal aperture by means of its arm or lever 22², having an elongated reciprocal slot 22⁴ to work in, the ends thereof being suitably formed, so as to reciprocally receive the cone-nut 22³ to securely fix the point-changer in the desired position. As shown in Fig. 2, the point-changer is set for writing the New York system, it being two points high, and, as shown in Fig. 4, it is set for writing three points high or the Braille system.

The space-bar 18 and the key-levers 21 and 23 are suspended by spiral springs to a common hanger-frame 24, as shown in Fig. 2, adapted to be fixed by screws to the inner side of the front frame-piece 5, Fig. 1, for the purpose of returning said bar and key-levers to their normal or stationary position after each stroke in manipulating the machine.

The drawing or impelling mechanism for the carriage consists of a circular barrel 25, a coiled steel spring 25', inclosed and secured in the barrel, a removable circular head 25², covering the spring and closing the end of the barrel, a pivotal set-screw 25³, adapted to pass through a reciprocal opening in the circular head and barrel, and a cord or pliable connection 25⁴ between the periphery of the revolving barrel and a stationary holder 25⁵ at the right side of the carriage-frame. (See Figs. 1, 24, 25, and 28.) The outer end of the coiled steel spring 25' is bent cylindrically, forming a miniature circular opening for the reception of the little set-screw 25⁶, whereby it is held so as to revolve with the barrel, the inner end of said spring being secured by a set-screw 25⁷ to the pivotal set-screw pin 25³, which is screwed into a reciprocal opening of its supporting-standard 25⁸, Fig. 2. The cord 25⁴ is knotted through a small opening in one of the annular rims of the barrel and provided with a little hook at the other end hooked through an opening in the stationary holder 25⁵, secured underneath the right end of the carriage-frame 3, Fig. 1.

The bell signal mechanism comprises a gong 26, a pivoted striker 26', and a triangular tripping device 26². The ordinary gong 26 is supported by a common screw-rod 26³, screwed into a reciprocal opening in a projecting arm on the under side of the rear frame-piece 4. The striker 26' is pivoted on and supported by a common screw-rod rigidly secured into the rear side of the frame-piece 4. (See Fig. 31.) The tripping device consists of the pivoted triangular tripper 26² and its bent hanger-frame 26⁴, formed suitably to the under side of the carriage-frame 3 and firmly fixed thereto by the set-screw that holds the rear frame-holder rigidly to the upper side in Fig. 1. (See Fig. 32 also.) It will be seen that the pivoted triangular tripper 26² is adapted to throw the striker 26' in writing a line and on returning the carriage to the beginning of a line glides over the striker without tripping it. A stroke of the signal-bell indicates to the writer that he is approaching the end of the line.

Having thus fully described my invention and set forth the operation thereof, what I claim as new, and desire to secure by Letters Patent, is—

1. A punctograph or point-writer having a rectangular carriage-frame provided with a paper-feed and line-spacing mechanism, the same comprising an actuating feed-roller, the thumb-wheel, impelling-gears, and retaining stop-gears fixed rigidly upon the ends of the actuating-roller axle for impelling, stopping, and retaining said roller in the proper line-space, an auxiliary reciprocating roller having its axle ends working in reciprocal slot-openings in the carriage-frame for permitting the roller to adjust itself automatically to the thickness of the paper, a pair of bent steel springs secured to the carriage-frame and pressing down upon the auxiliary-roller axle ends to hold it normally against the actuating-roller for feeding the paper, and a line-spacing, rack-raising lever having a bent spring-hook at its inner end adapted to engage the serratures of the impelling-gears for operating the actuating feed-roller by a stroke on the outer end of said lever and a movable frame supporting said lever adapted to be adjusted longitudinally and to be fixed rigidly upon the carriage-frame for the purpose of setting the lever in engagement with the proper impelling-gear to write the Braille or New York system respectively as may be desired, substantially as specified.

2. A punctograph or point-writer having a rectangular carriage-frame provided with a mechanical device for stopping and retaining the actuating feed-roller in the proper line-space, the same consisting of an adjustable bent steel spring having a pair of arms projecting inwardly and downwardly from its opposite ends and sides, the reciprocal bent ends of said arms being adapted to operate against the serrated periphery of the retaining stop-gears for stopping and retaining the actuating feed-roller in the proper line-space, a retaining thumb-screw working through a reciprocal opening in the bent steel spring adapted to be adjusted longitudinally upon its table-like supporting-lug and to be rigidly fixed thereon by the retaining thumb-screw so as to set the proper arm against the desired retaining stop-gear for writing the Braille or New York system respectively, substantially as specified.

3. A punctograph or point-writer having a rectangular carriage-frame provided with a hinged feed-rack having the under side of the front portion formed with a series of transverse grooves adapted to reciprocally receive the upper ends of the oscillating T and feed and check levers of the carriage-feed mechanism successively and consecutively as they are caused to complete an oscillation about their pivotal pins and arms projecting rearwardly over the carriage-frame and hinged thereto for enabling the rack to be raised above the ends of the oscillating levers to run the carriage manually in either direction without manipulating the machine, and a projecting pin or stud on the right arm of the feed-rack adapted to play in a reciprocal slot of the line-spacing, rack-raising lever for lifting the feed-rack by a stroke on the outer end of said lever, and a steel spring secured to the carriage-frame just back of the arm, pressing down upon said arm, so as to return the feed-rack to its normal position over the ends of the oscillating levers on releasing the stroke on the outer end of the line-spacing, rack-raising lever, substantially as specified.

4. A punctograph or point-writer having a carriage-feed mechanism, the same comprising a supporting-frame secured at the upper end to the irregular spacer-frame and at the lower inner end to the inside projection of the machine-supporting frame, an oscillating retaining T-lever pivoted to the supporting-frame and adapted to oscillate longitudinally with the grooves on the under side of the carriage-feed rack, an auxiliary feed and check lever pivoted in a reciprocal opening in the outer arm of the retaining T-lever and adapted to be impelled out of and back into said grooves by an oscillation of the retaining T-lever and to oscillate transversely with the grooves when disengaged therefrom, a straight steel spring secured to the supporting-frame pressing down upon the inner arm of the retaining T-lever, an elbow-lever pivoted about its longitudinal center to the supporting-frame operating against the under side of the retaining T-lever arm, and a feed-bar suitably connected by a rod to the inner end of the elbow-lever, having inward-projecting arms fulcrumed on the machine screw-rod forming an axis of oscillation for the feed-bar adapted to be oscillated thereon by a stroke on the outer end of the key-levers causing the retaining T-lever and its auxiliary feed and check lever to make one complete oscillation about their pivotal pins for feeding the carriage regularly and uniformly in manipulating the machine, substantially as specified.

5. A punctograph or point-writer having a point-spacing mechanism, the same comprising a space-bar having the rear ends of its arms fulcrumed on the machine screw-rod and its front portion provided with a series of regular and irregular slots, an angle-lever consisting of a lower and an upper arm pivoted about their angle center to the projecting arm of the irregular supporting-frame, a rod suitably connecting the lower angle-lever arm with the front portion of the space-bar, a forked traveler-rod pivoted to the upper angle-lever arm, its two outer members being adapted to pass through reciprocal openings or slots in the lower portion of the screw-shank of the traveler and of a projection of the irregular frame, a rectangular traveler adapted to travel on the irregular spacer-frame, having a screw-shank adapted to work through and to travel in a reciprocal opening in said frame, a spiral expansion-spring encircling said screw-shank and circular washers encircling the screw-shank at the ends of said spring all for the purpose of holding the traveler normally against its reciprocal frame, a connecting-spring hooked at one end to the screw-shank expansion-spring of the traveler and at the other to the auxiliary feed and check lever of the carriage-feed mechanism, and an irregular spacer-frame formed with all the necessary slits, openings, and projections essential to the proper fixture and complete operation of its several working parts and adapted to be rigidly fixed by set-screws to the under side of the front frame-piece of the machine, all for the purpose of point-spacing the puncture-line uniformly and causing the carriage to be fed regularly by each stroke on the outer ends of the key-levers in manipulating the machine, substantially as specified.
6. A punctograph or point-writer having a space-bar shifter, the same comprising a shifter-rod having a circular-shaped enlargement at the inner end encircling the machine screw-rod and reciprocally receiving the inner end of the space-bar arm fulcrumed upon said screw-rod and a reciprocal circular screw-nut at the outer end of the shifter-rod, having an annular rim reciprocally overlapped by a holder adapted to be rigidly fixed to the supporting-frame of the machine by a set-screw so as to hold the space-bar shifter in the proper position to which it is impelled by the manipulation of the circular screw-nut to set the proper slots of the space-bar directly under the key-levers for writing the Braille or New York system respectively, substantially as specified.

7. A punctograph or point-writer having a mechanism for cutting off one point-space to write a musical notation the same comprising an adjustable space-bar fixed movably upon the irregular spacer-frame of the point-spacing mechanism and adapted to infringe the distance of one point-space upon the oscillating carriage-feed levers, an oscillatory lever having a hook-and-eye connection with said space-bar and pivoted at the lower end in a little supporting-frame rigidly fixed to the front frame-plate of the machine having its projecting end working in a reciprocal slot in the front frame-plate and a reciprocal slot running diagonally across the body of the movable thumb-slide actuating the oscillatory lever to impel the movable space-bar inwardly or outwardly so as to infringe or to release its infringement upon the carriage-feed levers, a thumb-slide fixed movably upon the front frame-plate, having a diagonal reciprocal slot for the reception of the projecting end of the oscillatory lever and adapted to be moved longitudinally to actuate the oscillatory lever, and a thumb-block fixed movably to the base frame-plate, having a longitudinal reciprocal slot for the reception of the thumb-screw adapted to be manipulated to fix the block rigidly to the base frame-plate to add to the blank space the distance that has been taken away by the infringement of the space-bar upon the carriage-feed levers for reducing the point or punctured space, substantially as specified.

8. A punctograph or point-writer having a puncturing mechanism, the same comprising a series of key-levers rigidly fixed upon cylindrical hubs adapted to oscillate upon the machine screw-rod forming an axis of oscillation for the reciprocal cylindrical hubs and the key-levers rigidly fixed thereon, and a series of puncturing-rods having a ball-and-socket connection with the inner ends of the key-levers and adapted to work in and through reciprocal openings in the circular point-changer for puncturing the paper as it passes between the circular point-changer and the outer end of the gooseneck projection above it, having the under side thereof pierced with a series of little sockets for the reception of the ends of the puncturing-rods to puncture the paper by manipulating the outer ends of the key-levers, substantially as specified.

9. A punctograph or point-writer having a system point-changer, the same comprising a circular body portion adapted to fit into a reciprocal circular aperture in the rear frame-piece and provided with a series of reciprocal openings for the reception of the puncturing-rods and a small annular groove around its periphery, and a controlling arm or lever projecting downwardly from the bottom of the annular groove and bent at right angles with an outer screw end having a reciprocal cone-nut thereon, the screw end working in an elongated reciprocal slot in the rear frame-piece the ends of said slot being suitably formed so as to reciprocally receive the cone-nut for securely setting the point-changer after it has been turned into the proper position for writing the Braille or New York system respectively, substantially as specified.

ALBERT SWINDLER.

Witnesses:
J. O. WILLIAMS,
A. M. SMITH.